(12) United States Patent
Chang et al.

(10) Patent No.: US 8,463,591 B1
(45) Date of Patent: Jun. 11, 2013

(54) EFFICIENT POLYNOMIAL MAPPING OF DATA FOR USE WITH LINEAR SUPPORT VECTOR MACHINES

(75) Inventors: Yin-Wen Chang, Taipei (TW); Cho-Jui Hsieh, Taipei (TW); Kai-Wei Chang, Taipei (TW); Michael Ringgaard, Lystrup (DK); Chih-Jen Lin, Taipei (TW)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 12/846,741

(22) Filed: Jul. 29, 2010

Related U.S. Application Data

(60) Provisional application No. 61/230,669, filed on Jul. 31, 2009.

(51) Int. Cl.
*G06F 17/27* (2006.01)
*G06F 15/18* (2006.01)

(52) U.S. Cl.
USPC ..................... 704/1; 704/9; 706/12

(58) Field of Classification Search
USPC ..................... 704/1, 9; 706/10, 12
See application file for complete search history.

(56) References Cited

U.S. PATENT DOCUMENTS

| | | | | |
|---|---|---|---|---|
| 6,961,719 | B1 * | 11/2005 | Rai ................................ | 706/21 |
| 7,318,051 | B2 * | 1/2008 | Weston et al. .................. | 706/12 |
| 7,353,215 | B2 * | 4/2008 | Bartlett et al. ................. | 706/46 |
| 7,475,048 | B2 * | 1/2009 | Weston et al. .................. | 706/20 |
| 7,490,071 | B2 * | 2/2009 | Milenova et al. ............... | 706/45 |
| 7,617,163 | B2 * | 11/2009 | Ben-Hur et al. ................ | 706/12 |
| 7,783,473 | B2 * | 8/2010 | Bangalore et al. .............. | 704/2 |
| 7,788,193 | B2 * | 8/2010 | Bartlett et al. .................. | 706/14 |
| 7,895,148 | B2 * | 2/2011 | Ma et al. ......................... | 706/55 |
| 8,065,241 | B2 * | 11/2011 | Vapnik et al. ................... | 706/12 |
| 8,275,600 | B2 * | 9/2012 | Bilac et al. ...................... | 704/2 |
| 2005/0071300 | A1 * | 3/2005 | Bartlett et al. ................. | 706/12 |
| 2007/0011110 | A1 * | 1/2007 | Selvaraj et al. ................. | 706/12 |
| 2008/0109389 | A1 * | 5/2008 | Polyak et al. ................... | 706/12 |
| 2008/0162111 | A1 * | 7/2008 | Bangalore et al. .............. | 704/2 |
| 2008/0162117 | A1 * | 7/2008 | Bangalore et al. ............. | 704/10 |
| 2008/0301070 | A1 * | 12/2008 | Bartlett et al. ................. | 706/12 |
| 2009/0204553 | A1 * | 8/2009 | Gates ............................. | 706/12 |
| 2010/0161527 | A1 * | 6/2010 | Sellamanickam et al. ...... | 706/12 |

OTHER PUBLICATIONS

Boser, B. et al. "A Training Algorithm for Optimal Margin Classifiers." in: *Proceedings of the Fifth Annual Workshop of Computational Learning Theory* (ACM Press, 1992), pp. 144-152.

(Continued)

*Primary Examiner* — Martin Lerner
(74) *Attorney, Agent, or Firm* — Fish & Richardson P.C.

(57) ABSTRACT

Methods, systems, and apparatus, including computer programs encoded on computer storage media, for polynomial mapping of data for linear SVMs. In one aspect, a method includes training a linear classifier by receiving feature vectors and generating a condensed representation of a mapped vector corresponding to a polynomial mapping of each feature vector, the condensed representation including an index into a weight vector for each non-zero component of the mapped vector. A linear classifier is trained on the condensed representations. In another aspect, a method includes receiving a feature vector, identifying non-zero components resulting from a polynomial mapping of the feature vector, and mapping the combination of one or more elements of each non-zero component to a weight in a weight vector to determine a set of weights. The feature vector is classified according to a classification score derived by summing the set of weights.

26 Claims, 6 Drawing Sheets

OTHER PUBLICATIONS

Bottou, L. Stochastic Gradient Descent Examples on Toy Problems. Leon Bottou Website [online], 2007. Retrieved from the internet:<URL: http://leon.bottou.org/projects/sgd>. 5 pages.

Chang, C., and Lin, C. LIBSVM: A Library for Support Vector Machines. CSIE-NTU [online], 2001. Retrieved from the internet:<URL: http://www.csie.ntu.edu.tw/~cjlin/libsvm>, 4 pages.

Cortes, C. and Vapnik, V. 'Support-Vector Network', *Machine Learning*, vol. 20, No. 3 (1995), pp. 273-297.

Crammer, K., Singer, Y. "On the Learnability and Design of Output Codes for Multiclass Problems." in: *Machine Learning* (2002), pp. 201-233.

Fan, R., et al. 'Working Set Selection Using Second Order Information for Training SVM', *Journal of Machine Learning Research*, 2005, vol. 6, Retrieved from the internet:<URL: http://www.csie.ntu.edu.tw/~cjlin/papers/quadworkset.pdf>, pp. 1889-1918.

Fan, R., et al. 'LIBLINEAR: A Library for Large Linear Classification', *Journal of Machine Learning Research*, 2008, vol. 9. Retrieved from the internet:<URL: http://www.csie.ntu.edu.tw/~cjlin/papers/liblinear.pdf>, pp. 1871-1874.

Ferris, M. and Munson, T. "Interior Point Methods for Massive Support Vector Machines." in: SIAM Journal on Optimization, vol. 13, Issue 3 (2003), pp. 783-804.

Gertz, E., and Griffin, J. 'Support Vector Machine Classifiers for Large Data Sets', Technical Report ANL/MCS-TW-289, Argonne National Laboratory, 2005, 22 pages.

Goldberg, Y., and Elhadad, M. "SplitSVM: Fast, Space-Efficient, Non-Heuristic, Polynomial Kernel Computation for NLP Applications". In: *Proceedings of ACL*, 2008, pp. 237-240.

Hsieh, C., et al. 'A Dual Coordinate Descent Method for Large-Scale Linear SVM', Proceedings of the Twenty Fifth International Conference on Machine Learning (ICML) [online], 2008. Retrieved from the internet:<URL: http://www.csie.ntu.edu.tw/~cjlin/papers/cddual.pdf>. pp. 408-415.

Hsu, C., and Lin, C. "A Comparison of Methods for Multi-Class Support Vector Machines." in: *IEEE Transactions on Neural Networks*, vol. 13, No. 2 (2002), pp. 415-425.

Hsu, C., et al. 'A Practical Guide to Support Vector Classification', Technical Report, Department of Computer Science, National Taiwan University [online], 2003. Retrieved from the internet:<URL: http://www.csie.ntu.edu.tw/~cjlin/papers/guide/guide.pdf>, pp. 1-12.

Ifrim, G., et al. "Fast Logistic Regression for Text Categorization with Variable-Length N-grams". in: *Proceedings of the 14th ACM SIGKDD International Conference on Knowledge Discovery and Data Mining* (2008), pp. 354-382.

Isozaki, H., and Kazawa, H. "Efficient Support Vector Classifiers for Named Entity Recognition." in: *Proceedings of COLING* (2002), pp. 390-396.

Joachims, T. "Making Large-Scale SVM Leaning Practical." in: Schölkopf, B., et al., *Advances in Kernel Methods—Support Vector Learning* (Cambridge, MA: MIT Press, 1998), pp. 169-184.

Joachims, T. "Training Linear SVMs in Linear Time." in: *Proceedings of the ACM Conference on Knowledge Discovery and Data Mining (KDD)* (ACM, 2006), pp. 217-226.

Jung, J., et al. "Adaptive Constraint Reduction for Training Support Vector Machines." in: *Electronic Transactions on Numerical Analysis* (2008), vol. 31, pp. 156-177.

Keerthi, S., and Lin, C. "Asymptotic Behaviors of Support Vector Machines with Gaussian Kernel." in: *Neural Computation* (2003), vol. 15, No. 7, pp. 1667-1689.

Keerthi, S., et al. "Improvements to Platt's SMO Algorithm for SVM Classifier Design." in: *Neural Computation* (2001), vol. 13, pp. 637-649.

Keerthi, S., et al. "Building Support Vector Machines with Reduced Classifier Complexity." in: *Journal of Machine Learning Research* (2006), vol. 7, pp. 1493-1515.

Keerthi, S., et al. 'A Sequential Dual Method for Large Scale Multi-Class Linear SVMs', *Proceedings of the 14th ACM SIGKDD International Conference on Knowledge Discovery and Data Mining* [online], 2008. Retrieved from the internet:<URL: http://www.csie.ntu.edu.tw/~cjlin/papers/sdm_kdd.pdf>.

Kudo, T., and Matsumoto, Y. "Japanese Dependency Structure Analysis Based on Support Vector Machines." in: *Proceedings of the 2000 Joint SIGDAT Conference on Empirical Methods in Natural Language Processing and Very Large Corpora* (2000), vol. 13, pp. 18-25.

Kudo, T., and Matsumoto, Y. "Fast Methods for Kernel-Based Text Analysis." in: *Proceedings of the $41_{st}$ Annual Meeting of the Association of Computational Linguistics (ACL)* (2003), pp. 24-31.

Langford, J., et al. "Sparse Online Learning via Truncated Gradient." in: *Journal of Machine Learning Research* (2009), vol. 10, pp. 771-801.

Lee, Y., and Mangasarian, O. "RSVM: Reduced Support Vector Machines." in: *Proceedings of the First SIAM International Conference on Data Mining* (2001).

Lin, C., et al. 'Trust Region Newton Method for a Large-Scale Logistic Regression', *Journal of Machine Learning Research* [online], 2008, vol. 9. Retrieved from the Internet:<URL: http://www.csie.ntu.edu.tw/~cjlin/papers/logistic.pdf>,, pp. 627-650.

Lippert, R., and Rifkin, R. "Infinite-σ Limits for Tikhonov Regularization." in: *Journal of Machine Learning Research* (2006), vol. 7, pp. 855-876.

Mangasarian, O., and Musicant, D. "Successive Overrelaxation for Support Vector Machines." in: *IEEE Transactions on Neural Networks* (1999), vol. 10, No. 5, pp. 1032-1037.

Marcus, M., et al. "Building a Large Annotated Corpus of English: The Penn Treebank." in: *Computational Linguistics* (1993), vol. 19, pp. 313-330.

McDonald, R., and Nivre, J. "Characterizing the Errors of Data-Driven Dependency Parsing Models." in: *Proceedings of the Joint Conferences on Empirical Methods in Natural Language Processing and Computational Natural Language Learnings (EMNLP-CoNLL)* (2007), pp. 122-131.

McDonald, R., and Pereira, F. "Online Learning of Approximate Dependency Parsing Algorithms." in: *Proceedings of the 11th Conference of the European Chapter of the Association for Computational Linguistics (EACL)* (2006), pp. 81-88.

Moh, Y., and Buhmann, J. "Kernel Expansion for Online Preference Tracking." in: *Proceedings of the International Society for Music Information Retrieval (ISMIR)* (2008), pp. 167-172.

Nivre, J. "An Efficient Algorithm for Projective Dependency Parsing." in: *Proceedings of the 8th International Workshop on Parsing Technologies (IWPT 03)* (2003), pp. 149-160.

Nivre, J., and Hall, J. "MaltParser: A Language-Independent System for Data-Driven Dependency Parsing." in: *Proceedings of the Fourth Workshop on Treebanks and Linguistic Theories* (2005), 12 pages.

Nivre, J., et al. "MaltParser: A Language-Independent System for Data-Driven Dependency Parsing." in: *National Language Engineering* (2007), vol. 13, No. 2, pp. 95-135.

Ravichandran, D., et al. "The Terascale Challenge." in: *Proceedings of KDD Workshop on Mining for and from the Semantic Web (MSW-04)* (2004), pp. 1-11.

Shalev-Shwartz, S., et al. "Pegasos: Primal Estimated Sub-gradient Solver for SVM." in: *Proceedings of the 24th International Conference on Machine Learning (ICML)* (2007). pp. 807-814.

Weinberger, K., et al. "Feature Hashing for Large Scale Multitask Learning." in: *Proceedings of the 26th International Conference on Machine Learning (ICML)* (2009), pp. 1113-1120.

Yamada, H., and Matsumoto, Y. "Statistical Dependency Analysis with Support Vector Machines." in: *Proceedings of the 8th International Workshop on Parsing Technologies (IWPT 03)* (2003), 12 pages.

Yuan, G., et al. 'A Comparison of Optimization Methods for Large-Scale l1-Regularized Linear Classification,' Technical Report, Department of Computer Science, National Taiwan University [online] 2009. Retrieved from the Internet:<URL: http://www.csie.ntu.edu.tw/~cjlin/papers/l1.pdf>, pp. 1-51.

\* cited by examiner

EFFICIENT POLYNOMIAL MAPPING OF DATA FOR USE WITH LINEAR SUPPORT VECTOR MACHINES

CROSS-REFERENCE TO RELATED APPLICATIONS

This application claims the benefit under 35 U.S.C. §119(e) of U.S. Provisional Patent Application No. 61/230,669, titled "EFFICIENT POLYNOMIAL MAPPING OF DATA FOR USE WITH LINEAR SUPPORT VECTOR MACHINES," filed Jul. 31, 2009, which is incorporated here by reference.

BACKGROUND

This specification relates to efficiently training and using computer-implemented classifiers.

Support Vector Machines (SVMs) are tools for data classification. Non-linear SVMs map training and testing instances to a high dimensional space by a nonlinear function. While nonlinear SVMs have good accuracy in classification, nonlinear SVMs also require large amounts of memory. In general, a technique known as "the kernel trick" is used to reduce the memory demands of a nonlinear SVM However, training nonlinear SVMs, even with the kernel trick, still requires a great deal of memory and a great deal of training time, especially for large data sets.

Decomposition methods are a way to train nonlinear SVMs with less memory consumption than standard techniques. However, decomposition methods still require considerable training time for training data with a large number of features. In addition, the classifying procedure is slow.

SUMMARY

This specification describes technologies relating to efficient polynomial mapping of data for use with linear support vector machines.

This specification describes systems, methods, and computer program products that generate condensed representations of multi-dimensional feature vectors and use the condensed representations as input to train and use nonlinear SVMs.

In general, one aspect of the subject matter described in this specification can be embodied in methods that include the actions of receiving original training data including a plurality of training feature vectors and a respective decision for each training feature vector, each training feature vector representing a classification state, each element of each training feature vector indicating a presence or absence of a feature of the classification state; generating, for each training feature vector, a condensed representation of a mapped vector corresponding to a degree-d polynomial mapping of the training feature vector, the mapping defining each component of the mapped vector as either a single element of the training feature vector or a product of up to d elements of the training feature vector, the condensed representation of the mapped vector including an index for each non-zero component of the mapped vector, each index indicating a position in a weight vector of a weight for the corresponding non-zero mapped vector component; and using a linear support vector machine to train a linear classifier on the condensed representations, the linear support vector machine configured to receive as training data the condensed representations and decisions for the training feature vectors corresponding to the condensed representations, and determine the weights in the weight vector from the condensed training data. Other embodiments of this aspect include corresponding systems, apparatus, and computer programs recorded on computer storage devices, each configured to perform the operations of the methods.

These and other embodiments can each optionally include one or more of the following features. The degree d can be an integer greater than one. Each training feature vector can be a condensed representation of a corresponding feature vector, the condensed representation containing indices of only elements of the corresponding feature vector that are present in the classification state. The classification state can be a current state of a parser. The weight vector can only includes weights for features, and combinations of features, that are present in the original training data.

In general, another aspect of the subject matter described in this specification can be embodied in methods that include the actions of receiving a feature vector representing a current classification state, where each element of the feature vector indicates a presence or absence of a respective feature of the current classification state; identifying non-zero components resulting from a degree-d polynomial mapping of the feature vector to a set of polynomial components, the polynomial mapping associating each polynomial component with either a single element of the feature vector or a product of up to d elements of the feature vector; for each non-zero component, mapping the combination of one or more elements of the non-zero polynomial component to a single weight in a weight vector to determine a set of weights, where each position in the weight vector corresponds to a distinct combination of elements of the feature vector; deriving a classification score for the current classification state by summing the set of weights; and classifying the current classification state according to the classification score. Other embodiments of this aspect include corresponding systems, apparatus, and computer programs recorded on computer storage devices, each configured to perform the operations of the methods.

These and other embodiments can each optionally include one or more of the following features. The degree d can be an integer greater than one. The feature vector can be a condensed representation of a corresponding complete feature vector, the condensed representation containing indices of only elements of the corresponding complete feature vector that are present in the classification state. The classification state can be a state of a parser; the classification score can be a score for a particular transition in the parser; and classifying the current classification state according to the classification score can include receiving classification scores for various transitions and selecting the transition with the highest classification score.

Mapping the one or more elements of the non-zero components can include, for at least one of the non-zero components, determining that the weight vector does not include a weight for the at least one non-zero component, and selecting a default weight for the at least one non-zero component. The default weight can be zero. Mapping the one or more elements of each non-zero component to a weight in the weight vector can include, for each component that is associated with a product of elements of the feature vector, identifying an index into the weight vector from a hash table that takes the indices of the elements as input and outputs the index, and retrieving the weight stored at that index in the weight vector.

Particular embodiments of the subject matter described in this specification can be implemented so as to realize one or more of the following advantages. Low-degree polynomial mappings can be used to achieve as accurate of classifications as are generated with a kernel approach to nonlinear SVMs, but with less training time and less classification time. A low-degree polynomial mapping can be used to increase the speed of a parser without decreasing accuracy of the classifications performed within the parser. Classifiers for building a dependency relation graph can be trained in less time than the time required by kernel techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
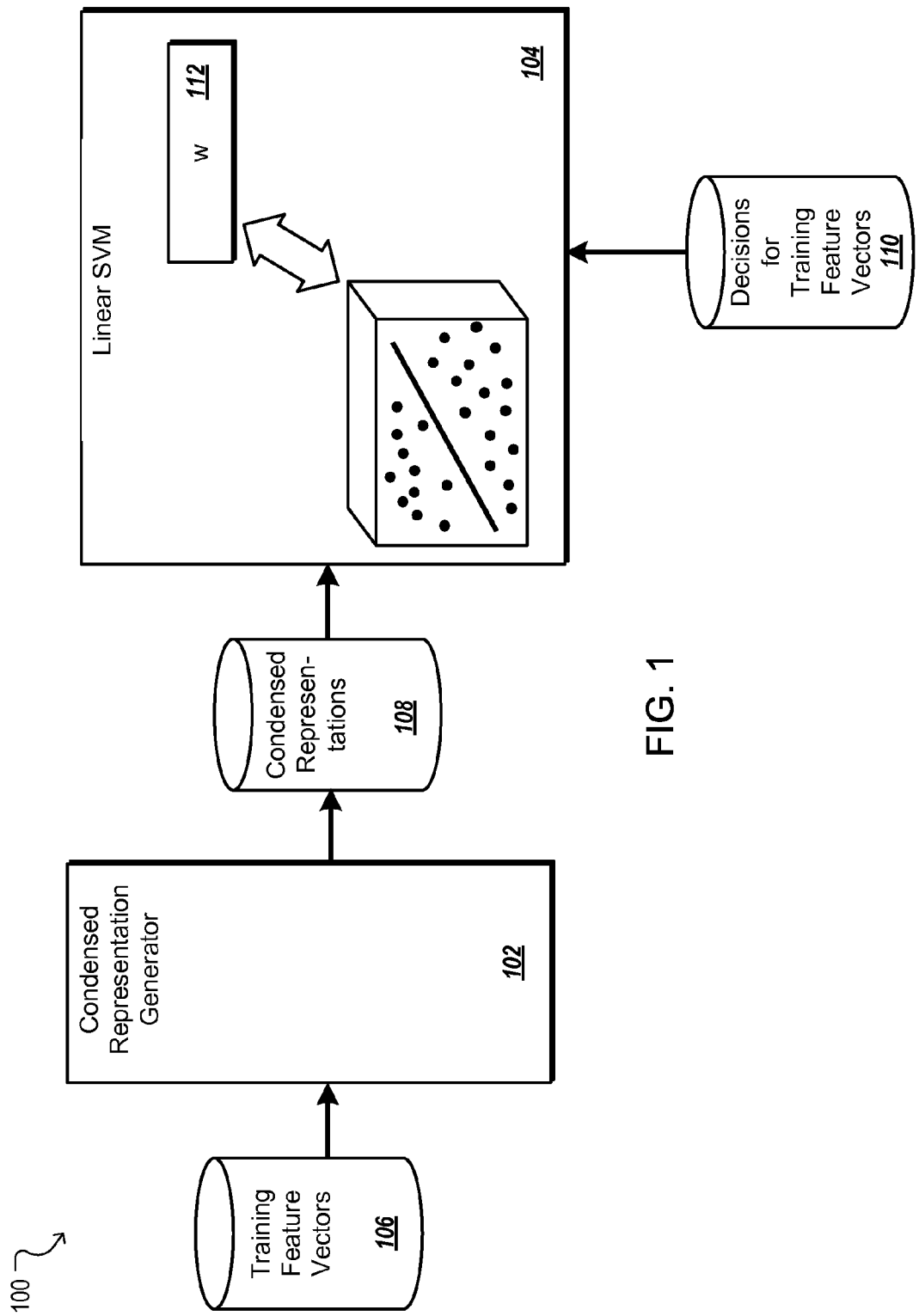
FIG. 1 illustrates an example system for training a linear classifier using a polynomial mapping of data.

FIG. 1 illustrates an example system 100 for training a linear classifier using a polynomial mapping of data. The system 100 includes a condensed representation generator 102 and a linear SVM 104.

The condensed representation generator 102 receives a set of training feature vectors 106 and generates a set of condensed representations 108 for the training feature vectors 106.

Each training feature vector (x) in the set of training feature vectors 106 corresponds to a given classification state, i.e., a state that is being classified, and has elements that each indicate the presence or absence of a respective feature of the classification state. In some implementations, the training feature vector is a vector of ones and zeros, where each one indicates the presence of a corresponding feature, and zero indicates the absence of a corresponding feature. In other implementations, the training feature vector is condensed so that only indices of the features that are present in the classification state are included in the vector, rather than a one or a zero for every feature.

The condensed representations 108 are condensed representations of mapped vectors corresponding to a polynomial mapping of each training feature vector of the set of training feature vectors 106. The polynomial mapping corresponds to a polynomial kernel of a SVM. In general, a polynomial kernel has the form:

$$K(x_i, x_j) = (\gamma x_i^T x_j + r)^d,$$

where $\gamma$ and $r$ are parameters and $d$ is the degree. The polynomial kernel is the product of two vectors $\phi(x_i)$ and $\phi(x_j)$. When d is small, e.g., 2 or 3, a linear SVM can be applied to an explicit representation of $\phi(x)$ rather than using a nonlinear SVM with a polynomial kernel. For example, when d=2 and $\gamma=r=1$, the mapped vector $\phi(x)$ can be explicitly represented as:

$$\phi(x) = [1, \sqrt{2}x_1, \ldots, \sqrt{2}x_n, x_1^2, \sqrt{2}x_1x_2, \sqrt{2}x_1x_3, \ldots, \sqrt{2}x_1x_n, \sqrt{2}x_2x_3, \ldots, \sqrt{2}x_2x_n, \ldots, \sqrt{2}x_{n-1}x_n]^T$$

Other forms of $\phi(x)$ can also be used. For example, the following form can be used:

$$\phi(x) = [1, x_1, \ldots, x_n, x_1^2, \ldots, x_n^2, x_1x_2, x_1x_3, \ldots, x_1x_n, x_2x_3, \ldots, x_2x_n, \ldots, x_{n-1}x_n]^T$$

The explicit representation of $\phi(x)$ can be unwieldy even when d is small, because the polynomial mapping leads to a large number of terms. Therefore, the condensed representation generator 102 generates a condensed representation of $\phi(x)$. The condensed representation only includes representations of each non-zero component of $\phi(x)$. In some implementations, the representations are indices where each index indicates a position in a weight vector w 112 of a weight corresponding to the component.

The system calculates the index into the weight vector for a given component by mapping the indices of the elements that make up the component to an index into the weight vector w 112. The index is determined from a hash table, e.g., associative array, using the indices of the corresponding elements in the feature vector x. For example, the system can calculate a component corresponding to the combination $(x_i, x_j)$ by generating a hash value for the combination (i,j), and retrieving the index stored at the hash value position in the hash table. When the feature vector x is a condensed representation of a larger feature vector, i.e., the feature vector x stores the indices of non-zero elements in the larger feature vector, the condensed representation generator 102 uses the indices stored in the condensed representation of the larger feature vector.

For example, the condensed representation generator 102 can generate the hash table M and the condensed representation of $\phi(x)$ (condensed_phi) as described in the following pseudocode. In the following pseudocode, the degree of the polynomial is assumed to be 2: N is a counter variable used to track what index into the weight vector is being assigned to a hash value, and i and j are counter variables used to track which features are being combined. M is the hash table that stores indexes into the weight vector for combinations of elements into the feature vector x. To access the index into the weight vector stored in M for a given combination (a, b), the method generates a hash code from a and b, and retrieves the index into the weight vector stored at the index given by the hash code. x is a feature vector in the training data. The feature vector x is a condensed representation that stores indices of the non-zero features in x.

```
N = 0;
M = null;
For all feature vectors x in the training data:
    condensed_phi = null
    For i = 1 to the number of elements in x:
        For j = i to the number of elements in x:
            a = min(x[i], x[j]);
            b = max(x[i], x[j]);
            If M does not include an index value for the
            combination (a, b):
                N = N+1;
                Store the index N in M for the
```

-continued

```
        combination (a, b);
        Append N to condensed_phi;
  Else
        Append the index value stored in M for
        the combination (a, b) to condensed_phi.
```

The illustrated method iterates over the non-zero pairs of features of each training vector. If an index for the combination is not stored in the hash table M, the method increments the counter N, and stores the value of N as the index value for the combination. If an index value for the combination is already stored in the hash table M, the method uses that index as the representation for the combination stored in phi.

The illustrated method relies on the dependency between components of $\phi(x)$. In general, two components depend on each other if the two components will always have the same value. For example, components of $\phi(x)$ corresponding to a single element of the feature vector and components corresponding to the single element squared will always have the same value. If the single element is zero, the square will also be zero, and if the single element is one, the square will also be one. Similarly, the component of $\phi(x)$ corresponding to the product of the ith element of the feature vector times the jth element of the feature vector is dependent on the component of $\phi(x)$ corresponding to the product of the jth element of the feature vector times ith element of the feature vector—the two components will both have the same value. Therefore, to save space, condensed_phi only includes a single component from a given group of dependent components, and the weight in the weight vector reflects the presence of all of the dependent components.

In some other implementations, the method adds an entry into M for each single element of the feature vector as well as components corresponding to the single element of the feature vector squared.

The linear SVM 104 receives training data, including the condensed representations 108 and decisions 110 for the training feature vectors corresponding to the condensed representations. The linear SVM 104 uses this training data to train a linear classifier by learning weights corresponding to the elements of $\phi(x)$. These weights are stored in a weight vector w 112. The weight vector w 112 is a data structure that stores weights corresponding to elements in $\phi(x)$. The weight vector w 112 can take various forms including, for example, a vector or a hash table, and is indexed as described above.

In some implementations, the linear SVM 104 uses a condensed form of the weight vector w, one that only has entries for non-zero components of the $\phi(x)$ observed in the training data.

The linear SVM 104 processes the condensed representations 108 of the feature vectors and learns weights stored according to the structure of the weight vector. For example, the linear SVM can process condensed representations 108 of the feature vectors where the condensed representations 108 include indices into the weight vector for each non-zero component of $\phi(x)$.

Because the condensed representations 108 are an explicit linear representation of the polynomial mapped vectors $\phi(x)$, the linear SVM 104 can use linear decomposition to train the classifier. Linear decomposition is often a faster technique than techniques used to train nonlinear SVMs.

A suitable conventional technique for linear decomposition is as follows.

Given $\alpha$. Calculate $w=\Sigma_{j=1}^{l} y_j \alpha_j x_j$.

While $\alpha$ is not optimal:

(1) Select the ith element randomly, sequentially, or by other methods.

$$\overline{\alpha}_i \leftarrow \min\left(\max\left(\alpha_i - \frac{y_i w^T x_i - 1}{Q_{ii}}, 0\right), C\right). \quad (2)$$

(3) $w \leftarrow w + (\overline{\alpha}_i - \alpha_i) y_i x_i$.

In the above technique, w is the weight vector, l is the number of training vectors, $x_i$ is the condensed representation of $\phi(x)$ for a given feature vector, $y_i$ is a decision for the feature vector $\phi(x)$, C is a penalty parameter, $\alpha$ is a Lagrange multiplier, and $Q_{ii}=y_i y_i x_i^T x_i$.

Other methods for training a classifier using a SVM, for example, the Newton method, can also be used.

While the above description envisions pre-computing the condensed representations 108 and providing them as input to the linear SVM 104, other techniques can also be used. For example, the system 100 can calculate and store $\{\phi(x_i), \ldots, \phi(x_l)\}$ as the new input data or can use $\{x_1, \ldots, x_l\}$ as the input data and calculate $\phi(x_i)$ as part of the linear decomposition. Calculating $\{\phi(x_i), \ldots, \phi(x_l)\}$ as the new input data does not require any modification of linear SVM solvers, but does require a large amount of disk or memory space to store $\phi(x_i)$ for each i. Calculating $\phi(x_i)$ in the decomposition does not require extra memory, but requires some modifications of the decomposition implementation. For data with a manageable number of features, calculating $\phi(x_i)$ during decomposition may be the fastest, because even if all $\phi(x_i)$ can be stored in memory, accessing the $\phi(x_i)$ from memory may be slower than calculating them. However, for an application with very large number of features and a small number of non-zero features, the technique illustrated in FIG. 1 may be the most suitable.

Figure 2:
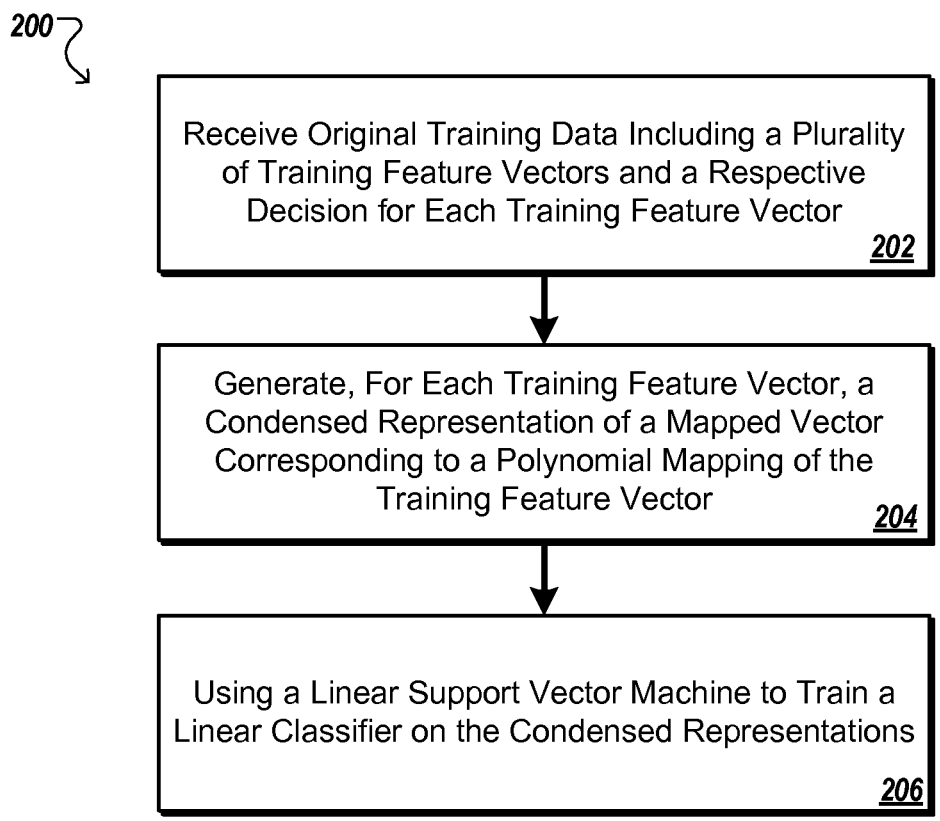
FIG. 2 illustrates an example method for training a linear classifier on condensed representations of mapped vectors corresponding to polynomial mappings of training feature vectors.

FIG. 2 illustrates an example method 200 for training a linear classifier on condensed representations of mapped vectors corresponding to polynomial mappings of training feature vectors. For convenience, the method will be described with reference to a system including one or more computing devices that performs the method 200. The system can be, for example, the system 100 described above with reference to FIG. 1.

The system receives original training data including a plurality of training feature vectors and a respective decision for each training feature vector (202). The system generates, for each training feature vector, a condensed representation of a mapped vector corresponding to a polynomial mapping of the training feature vector (204). The mapped vector is $\phi(x)$, described above with reference to FIG. 1. Each component of the mapped vector is either a single element of the training feature vector or a product of elements of the training feature vector.

The system uses a linear SVM to train a linear classifier on the condensed representations (206). The linear SVM is configured to receive as training data the condensed representations and decisions for the training feature vectors corresponding to the condensed representations, and determine the weights in the weight vector from the condensed training data, for example, as described above with reference to FIG. 1.

In some implementations, after the system receives the original training data, the system processes the training data to identify features that are present in the training data at least a threshold number of times. The system then generates the weight vector so that the weight vector only stores weights for components of the mapped vector that are non-zero at least a threshold number of times.

Figure 3:
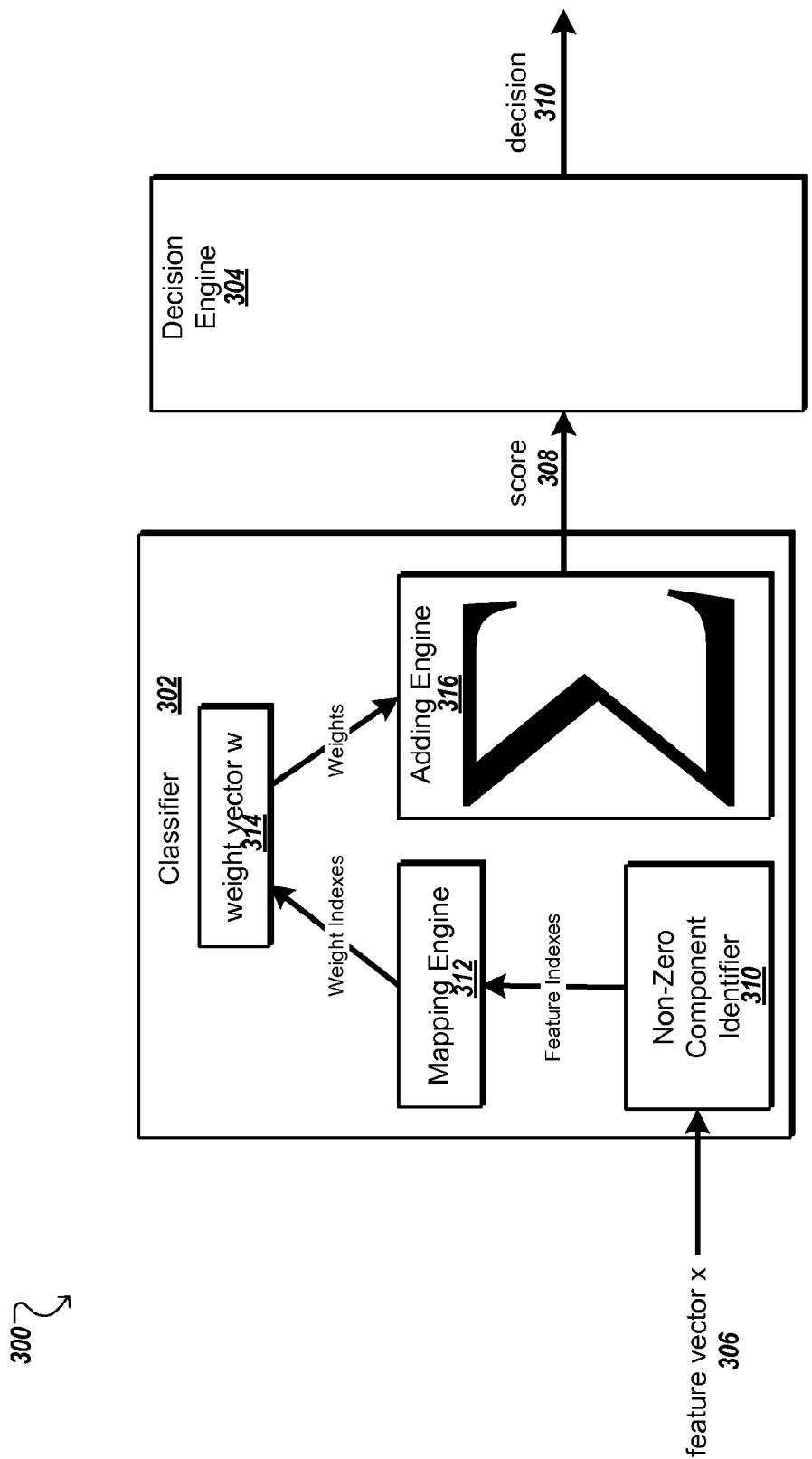
FIG. 3 illustrates an example system for classifying a feature vector.

FIG. 3 illustrates an example system 300 for classifying a feature vector. The system includes a classifier 302 and a decision engine 304.

The classifier 302 receives a feature vector x 306, generates a score 308 for the feature vector x 306, and provides the score 308 to the decision engine 304. The feature vector x 306 represents a classification state and can be formatted like the training feature vectors described above with reference to FIG. 1.

The classifier 302 includes a non-zero component identifier 310, a mapping engine 312, a weight vector w 314, and an adding engine 316. The non-zero component identifier 310 identifies non-zero components in a mapped vector corresponding to a polynomial mapping of the feature vector, e.g., $\phi(x)$, described above with reference to FIG. 1. The non-zero component identifier 310 identifies non-zero components without explicitly computing the products. In particular, the non-zero component identifier 310 identifies the components that are generated from only non-zero features in the feature vector x 306. In some implementations, the non-zero component identifier 310 condenses the non-zero components, for example, to remove components that are dependent on each other, as described above with reference to FIG. 1. The non-zero component identifier 310 provides the indices of the elements of the feature vector corresponding to the non-zero components of the mapped vector to the mapping engine 312.

The mapping engine 312 generates an index into the weight vector w 314 from the indices of the non-zero features, for example, as described above with reference to FIG. 1. While the mapping engine 312 and weight vector w 314 are illustrated as separate parts of the classifier 302, the mapping engine 312 and weight vector w can alternatively be a single element of the classifier 302. For example, the weight vector w 314 can be a hash map that receives the inputs to the mapping engine 312 and outputs the weight stored at an index corresponding to those inputs.

The classifier 302 retrieves the weights from the weight vector 314 corresponding to the indices, and sums them using the adding engine 316. The classifier 302 provides this sum to the decision engine 304 as the score 308. In some implementations, one or more of the non-zero components do not have a corresponding weight stored in the weight vector w 314. In these implementations, the classifier 302 uses a default weight, e.g., zero, for components that do not have a weight stored in the weight vector w 314.

The decision engine 304 receives the score 308 from the classifier and outputs a decision 310. In some implementations, the decision 310 is a yes or no decision indicating whether the classification state corresponding to the feature vector has a certain property.

In other implementations, the decision 310 output by the decision engine 304 is a selection of a property that applies to the classification state. In these implementations, the score 308 output by the classifier 302 is a "one-against-the-rest" score indicating a likelihood that the classification state has a certain property as opposed to all other properties. The decision engine 304 receives multiple scores from multiple classifiers, each giving a "one-against-the-rest" score for a particular property. The decision engine 304 then picks the most likely property, for example, by picking the property with the highest score.

Figure 4:
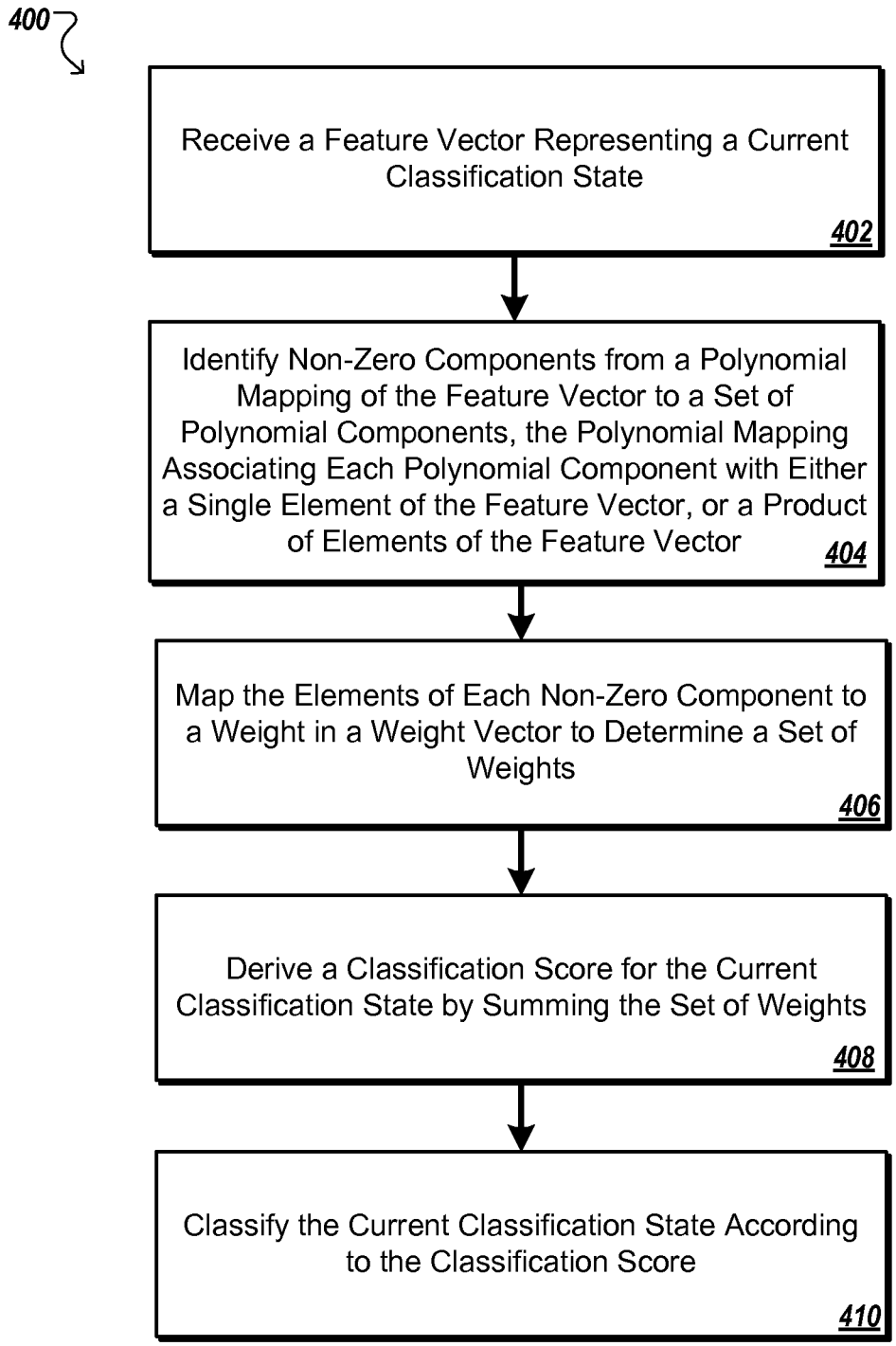
FIG. 4 illustrates an example method for classifying a classification state whose features are represented by a feature vector.

FIG. 4 illustrates an example method 400 for classifying a classification state whose features are represented by a feature vector. For convenience, the method will be described with reference to a system including one or more computing devices that performs the method 400. The system can be, for example, the system 300 described above with reference to FIG. 3.

The system receives a feature vector representing a current classification state (402). The system identifies non-zero components from a polynomial mapping of the feature vector to a set of polynomial components, the polynomial mapping associating each component with either a single element of the feature vector, or a product of elements of the feature vector (404). The mapping maps the feature vector to a mapped vector, for example, the mapped vector $\phi(x)$, described above with reference to FIG. 1. The system determines the non-zero components of the mapped vector, for example, as described above with reference to FIG. 3. The system maps the elements of each non-zero component to a weight in a weight vector to determine a set of weights (406), for example, as described above with reference to FIG. 3. The system derives a classification score for the current classification state by summing the set of weights (408), and classifies the current classification state according to the classification score (410), for example, as described above with reference to FIG. 3.

Figure 5:
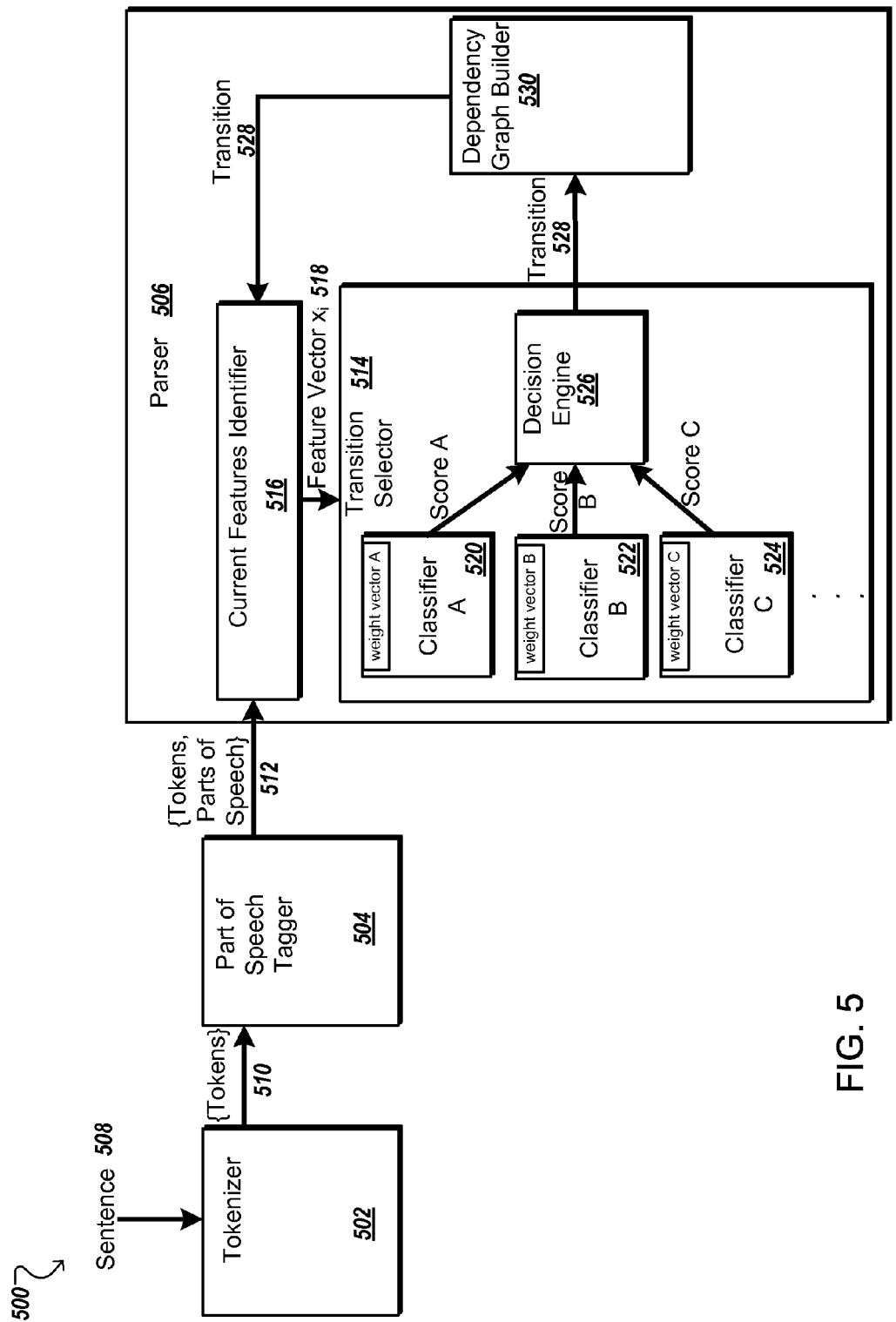
FIG. 5 illustrates an example parsing system that performs data-driven dependency parsing.
Figure 6:
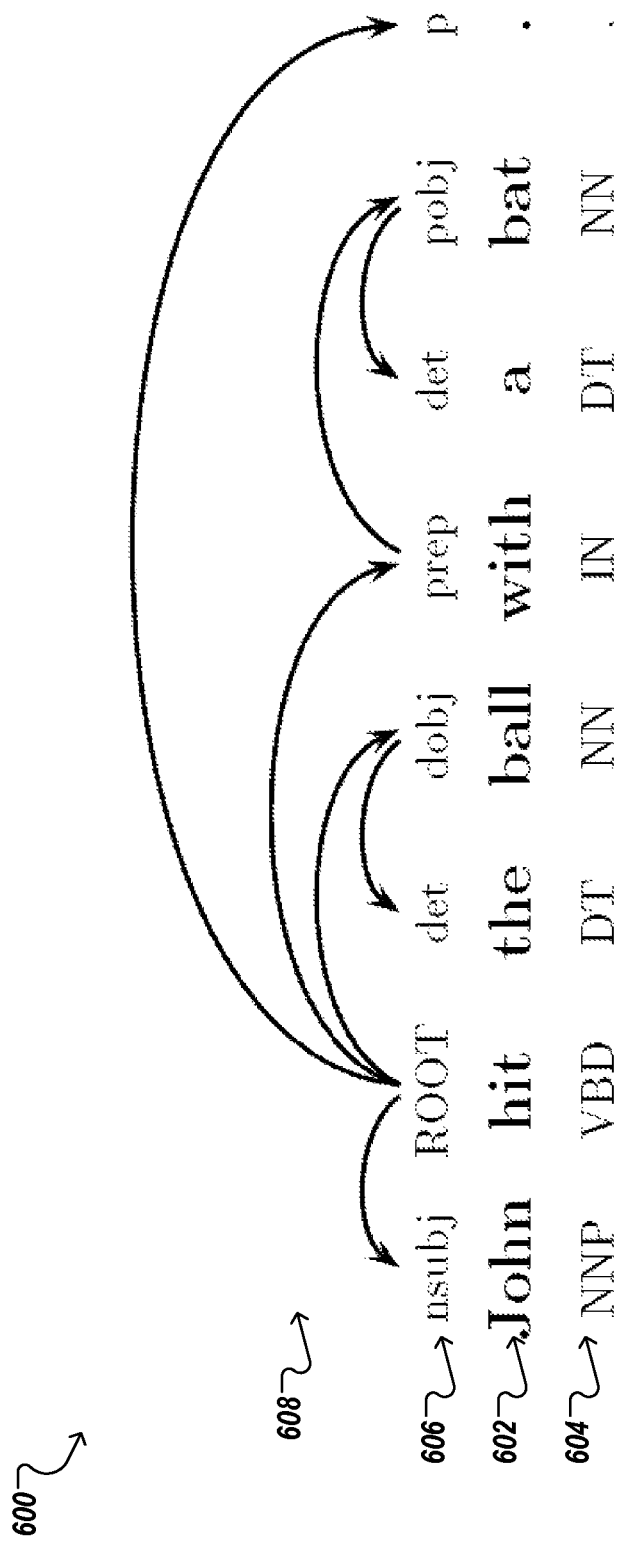
FIG. 6 illustrates an example dependency graph for a sentence.

FIG. 5 illustrates an example parsing system 500 that uses the classifier described above to perform data-driven dependency parsing. Data-driven dependency parsing constructs dependency graphs using a classifier learned from training data, rather than grammar-based rules. A dependency graph represents syntactic modifiers for words in a sentence through labeled directed edges. The word being modified is the "head" and the word doing the modifying is the "modifier." FIG. 6 illustrates an example dependency graph for a particular text sentence.

The parsing system 500 includes a tokenizer 502, a part of speech tagger 504, and a parser 506. The tokenizer 502 receives a sentence 508, e.g., a natural language sentence, and generates tokens 510 corresponding to the words and punctuation in the sentence. The part of speech tagger 504 receives the tokens 510 and outputs a list of tokens, each associated with a part of speech, 512.

The parser processes the tokens using a transition selector 514 and builds the dependency graph. The parser uses a transition-based parsing technique that builds a labeled dependency graph in one left-to-right pass over the input, using a stack to store partially processed tokens. At each step, the parser 506 uses the transition selector 514 to decide which transition to perform.

The parser 506 chooses from the following transitions:

SHIFT: Pushes the next input token to the top of the stack and advances to the next input token.

REDUCE: Takes the top token from the stack.

LEFT-ARC(r): Adds an edge with label r from the next input token to the token on top of the stack and pops the top element off the stack.

RIGHT-ARC(r): Adds an edge with label r from the top token on the stack to the next input token. Then pushes the current input token to the stack and advances to the next input token.

The current features identifier 516 in the parser 506 identifies a feature vector $x_i$ 518 corresponding to features in the current parse state. The parse state includes the stack, the remaining input tokens, and the partially built dependency graph. The feature identifier 516 identifies the binary features corresponding to various values for various feature types.

Example feature types include the part of speech tag of the current token, the part of speech tag of tokens that are a various number of tokens to the right of the current token in the sentence, the word form of the current token, the word form of tokens that are a various number of tokens to the right of the current token in the sentence, the part of speech tag of the top token on the stack, the part of speech tag of tokens at various depths in the stack, the dependency relation label for the edge between the token on the top of the stack and its head token in the partially built dependency graph, the word form of the top token on the stack, the word form of the head token for the top token on the stack, the dependency relation label for the edge between the leftmost, or rightmost, modifier of the token on the top of the stack and its head in the partially built dependency graph, the dependency relation label for the edge between the leftmost, or rightmost, modifier of the current input token and its head in the partially built dependency graph.

Once the current feature identifier 516 identifies the feature vector 518 for a given parse state, the parser 506 sends the feature vector 518 to the transition selector 514. The transition selector 514 provides the feature vector 518 to various classifiers, e.g., classifier A 520, classifier B 522, and classifier C 524. The classifiers generate scores for the feature vector that indicate how likely a given transition, or a label for the RIGHT-ARC and LEFT-ARC transitions, is correct for the given feature vector. Each classifier corresponds to a given transition and uses a weight vector that was trained for that transition using a linear SVM, for example, as described above with reference to FIGS. 1-2. The classifiers generate the scores, for example, as described above with reference to FIG. 3.

In some implementations, the classifiers further correspond to particular sub-sets of training data, e.g., training data having a certain feature, or training data for a vector corresponding to a token with a particular part of speech being on the stack. In these implementations, the transition selector 514 only uses the classifiers that are appropriate to the current feature vector 518. The classifiers correspond to particular sets of training data when the SVM that processed the training data to generate the transition selector 514 divides the training data into multiple groups of data. For example, if a feature i takes two values a and b, the training data can be divided into $\{x|x_i=a\}$ and $\{x|x_i=b\}$, leading to two weight vectors $w_a$ and $w_b$, each corresponding to an individual classifier. The transition selector 514 then uses the individual classifier corresponding to the value of i in the current vector.

The decision engine 526 receives scores from the various classifiers and determines a transition 528 for the current parse state, e.g., by selecting the transition corresponding to the highest score. The transition selector 514 provides the transition 528 to the dependency graph builder 530, which uses the transition 528 to build the dependency graph, and also sends the transition 528 to the current features identifier 516. The current features identifier 516 transitions to the next state based in part on the transition.

FIG. 6 illustrates an example dependency graph 600 for a sentence 602. The dependency graph 600 represents syntactic modifiers for words in a sentence through labeled directed edges, and can be built, for example, using the system described above with reference to FIG. 5.

Each word in the sentence 602 is tagged with its corresponding part of speech 604. For example, "hit" is a past tense verb ("VBD"), and "with" is a preposition "IN." The graph labels each word that modifies another word (modifier) with the relationship 606 between the modifier word and the word being modified (head). For example, "John" is modified by "hit" because "John" is the noun subject of "hit." The arrows 608 indicate which word is doing the modifying and which word is being modified. For example, in FIG. 6, the word "hit" modifies the word "John" as indicated by the arrow from "hit" to "John."

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, while the above describes using condensed representations with linear support vector machines, similar representations can be used with other discriminative classifiers, for example, Naïve Bayes, Perceptron, and Maximum Entropy classifiers. As another example, the actions recited in the claims can be performed in a different order and still achieve desirable results. As another example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:

receiving, in a computing system comprising one or more computers, original training data including a plurality of training feature vectors and a respective decision for each training feature vector, each training feature vector representing a parse state of a parser, each element of each training feature vector indicating a presence or absence of a feature of the parse state, the parser constructing a dependency graph for a sentence having words and punctuation, the parser input comprising tokens corresponding to the words and punctuation of the sentence;

generating, by the computing system, for each training feature vector, a condensed representation of a mapped vector corresponding to a degree-d polynomial mapping of the training feature vector, the mapping defining each component of the mapped vector as either a single element of the training feature vector or a product of up to d elements of the training feature vector, the condensed representation of the mapped vector including an index for each non-zero component of the mapped vector, each index indicating a position in a weight vector of a weight for the corresponding non-zero mapped vector component; and using a linear support vector machine to train a classifier on the condensed representations, the linear support vector machine configured to receive as training data the condensed representations and decisions for the training feature vectors corresponding to the condensed representations, and determine the weights in the weight vector from the condensed training data, where the classifier corresponds to a given parsing transition and uses the weight vector that was trained for the given parsing transition to generate a score for the given parsing transition, where the score for the given parsing transition is used to determine whether to perform the given parsing transition in building a dependency graph, the dependency graph representing syntactic modifiers for words in the sentence through labeled directed edges.

2. The method of claim 1, where d is an integer greater than one.

3. The method of claim 1, where each training feature vector is a condensed representation of a corresponding feature vector, the condensed representation containing indices of only elements of the corresponding feature vector that are present in the parse state.

4. The method of claim 1, where the tokens corresponding to the words and punctuation of the sentence comprise tokens each associated with a respective part of speech.

5. The method of claim 1, where the weight vector only includes weights for features, and combinations of features, that are present in the original training data.

6. A computer-implemented method, comprising:
receiving a computer-readable list of tokens representing a sentence having words and punctuation, the tokens corresponding to the words and punctuation of the sentence;
identifying, in a computing system comprising one or more computers, from the list of tokens, a feature vector corresponding to features in a current parse state of a parser, where each element of the feature vector indicates a presence or absence of a respective feature of the current parse state;
identifying, by operation of the computing system, non-zero components resulting from a degree-d polynomial mapping of the feature vector to a set of polynomial components, the polynomial mapping associating each polynomial component with either a single element of the feature vector or a product of up to d elements of the feature vector;
for each non-zero component, mapping, by operation of the computing system, the combination of one or more elements of the non-zero polynomial component to a single weight in a weight vector to determine a set of weights, where each position in the weight vector corresponds to a distinct combination of elements of the feature vector;
deriving, by operation of the computing system, a classification score for the current parse state for a particular transition in the parser, by summing the set of weights; and
using the transition to build a dependency graph, the dependency graph representing syntactic modifiers for words in the sentence through labeled directed edges.

7. The method of claim 6, where d is an integer greater than one.

8. The method of claim 6, where the feature vector is a condensed representation of a corresponding complete feature vector, the condensed representation containing indices of only elements of the corresponding complete feature vector that are present in the parse state.

9. The method of claim 6, where:
the list of tokens comprises tokens each associated with a respective part of speech.

10. The method of claim 6, where mapping the one or more elements of the non-zero components comprises, for at least one of the non-zero components, determining that the weight vector does not include a weight for the at least one non-zero component, and selecting a default weight for the at least one non-zero component.

11. The method of claim 10, where the default weight is zero.

12. The method of claim 6, where mapping the one or more elements of each non-zero component to a weight in the weight vector includes, for each component that is associated with a product of elements of the feature vector, identifying an index into the weight vector from a hash table that takes the indices of the elements as input and outputs the index, and retrieving the weight stored at that index in the weight vector.

13. A computer storage medium encoded with a computer program, the computer program comprising instructions that when executed by data processing apparatus cause the data processing apparatus to perform actions comprising:
receiving original training data including a plurality of training feature vectors and a respective decision for each training feature vector, each training feature vector representing a parse state of a parser, each element of each training feature vector indicating a presence or absence of a feature of the parse state, the parser constructing a dependency graph for a sentence having words and punctuation, the parser input comprising tokens corresponding to the words and punctuation of the sentence;
generating, for each training feature vector, a condensed representation of a mapped vector corresponding to a degree-d polynomial mapping of the training feature vector, the mapping defining each component of the mapped vector as either a single element of the training feature vector or a product of up to d elements of the training feature vector, the condensed representation of the mapped vector including an index for each non-zero component of the mapped vector, each index indicating a position in a weight vector of a weight for the corresponding non-zero mapped vector component; and
using a linear support vector machine to train a classifier on the condensed representations, the linear support vector machine configured to receive as training data the condensed representations and decisions for the training feature vectors corresponding to the condensed representations, and determine the weights in the weight vector from the condensed training data, where the classifier corresponds to a given parsing transition and uses the weight vector that was trained for the given parsing transition to generate a score for the given parsing transition, where the score for the given parsing transition is used to determine whether to perform the given parsing transition in building a dependency graph, the dependency graph representing syntactic modifiers for words in the sentence through labeled directed edges.

14. A computer storage medium encoded with a computer program, the computer program comprising instructions that when executed by data processing apparatus cause the data processing apparatus to perform actions comprising:
receiving a list of tokens representing a sentence having words and punctuation, the tokens corresponding to the words and punctuation of the sentence;
identifying, from the list of tokens, a feature vector corresponding to features in a current parse state of a parser, where each element of the feature vector indicates a presence or absence of a respective feature of the current parse state;
identifying non-zero components resulting from a degree-d polynomial mapping of the feature vector to a set of polynomial components, the polynomial mapping associating each polynomial component with either a single element of the feature vector or a product of up to d elements of the feature vector;

for each non-zero component, mapping the combination of one or more elements of the non-zero polynomial component to a single weight in a weight vector to determine a set of weights, where each position in the weight vector corresponds to a distinct combination of elements of the feature vector;

deriving a classification score for the current parse state for a particular transition in the parser, by summing the set of weights; and using the transition to build a dependency graph, the dependency graph representing syntactic modifiers for words in the sentence through labeled directed edges.

15. A system, comprising:

one or more computers programmed to perform actions comprising:

receiving original training data including a plurality of training feature vectors and a respective decision for each training feature vector, each training feature vector representing a parse state of a parser, each element of each training feature vector indicating a presence or absence of a feature of the parse state, the parser configured to construct a dependency graph for a sentence having words and punctuation, the parser input comprising tokens corresponding to the words and punctuation of the sentence;

generating, for each training feature vector, a condensed representation of a mapped vector corresponding to a degree-d polynomial mapping of the training feature vector, the mapping defining each component of the mapped vector as either a single element of the training feature vector or a product of up to d elements of the training feature vector, the condensed representation of the mapped vector including an index for each non-zero component of the mapped vector, each index indicating a position in a weight vector of a weight for the corresponding non-zero mapped vector component; and using a linear support vector machine to train a classifier on the condensed representations, the linear support vector machine configured to receive as training data the condensed representations and decisions for the training feature vectors corresponding to the condensed representations, and determine the weights in the weight vector from the condensed training data, where the classifier corresponds to a given parsing transition and uses the weight vector that was trained for the given parsing transition to generate a score for the given parsing transition, where the score for the given parsing transition is used to determine whether to perform the given parsing transition in building a dependency graph, the dependency graph representing syntactic modifiers for words in the sentence through labeled directed edges.

16. The system of claim 15, where d is an integer greater than one.

17. The system of claim 15, where each training feature vector is a condensed representation of a corresponding feature vector, the condensed representation containing indices of only elements of the corresponding feature vector that are present in the parse state.

18. The system of claim 15, where the tokens corresponding to the words and punctuation of the sentence comprise tokens each associated with a respective part of speech.

19. The system of claim 15, where the weight vector only includes weights for features, and combinations of features, that are present in the original training data.

20. A system, comprising:

one or more computers programmed to perform actions comprising:

receiving a list of tokens representing a sentence having words and punctuation, the tokens corresponding to the words and punctuation of the sentence;

identifying, from the list of tokens, a feature vector corresponding to features in a current parse state of a parser, where each element of the feature vector indicates a presence or absence of a respective feature of the current parse state;

identifying non-zero components resulting from a degree-d polynomial mapping of the feature vector to a set of polynomial components, the polynomial mapping associating each polynomial component with either a single element of the feature vector or a product of up to d elements of the feature vector;

for each non-zero component, mapping the combination of one or more elements of the non-zero polynomial component to a single weight in a weight vector to determine a set of weights, where each position in the weight vector corresponds to a distinct combination of elements of the feature vector;

deriving a classification score for the current parse state for a particular transition in the parser, by summing the set of weights; and using the transition to build a dependency graph, the dependency graph representing syntactic modifiers for words in the sentence through labeled directed edges.

21. The system of claim 20, where d is an integer greater than one.

22. The system of claim 20, where the feature vector is a condensed representation of a corresponding complete feature vector, the condensed representation containing indices of only elements of the corresponding complete feature vector that are present in the parse state.

23. The system of claim 20, where:

the list of tokens comprises tokens each associated with a respective part of speech.

24. The system of claim 20, where mapping the one or more elements of the non-zero components comprises, for at least one of the non-zero components, determining that the weight vector does not include a weight for the at least one non-zero component, and selecting a default weight for the at least one non-zero component.

25. The system of claim 24, where the default weight is zero.

26. The system of claim 24, where mapping the one or more elements of each non-zero component to a weight in the weight vector includes, for each component that is associated with a product of elements of the feature vector, identifying an index into the weight vector from a hash table that takes the indices of the elements as input and outputs the index, and retrieving the weight stored at that index in the weight vector.

* * * * *